March 25, 1952 — C. C. KEESLER — 2,590,181
POWER MANIPULATED DETACHABLE GOOSENECK FOR TRAILERS
Filed Dec. 23, 1949 — 5 Sheets-Sheet 1

March 25, 1952  C. C. KEESLER  2,590,181
POWER MANIPULATED DETACHABLE GOOSENECK FOR TRAILERS
Filed Dec. 23, 1949  5 Sheets-Sheet 3

INVENTOR.
Clyde C. Keesler,
BY
Geher + Leonard,
ATTORNEYS.

March 25, 1952  C. C. KEESLER  2,590,181
POWER MANIPULATED DETACHABLE GOOSENECK FOR TRAILERS
Filed Dec. 23, 1949  5 Sheets-Sheet 4

INVENTOR.
Clyde C. Keesler,
BY
Gehr & Leonard,
his ATTORNEYS.

March 25, 1952

C. C. KEESLER 2,590,181

POWER MANIPULATED DETACHABLE GOOSENECK FOR TRAILERS

Filed Dec. 23, 1949

INVENTOR.
Clyde C. Keesler,
BY Gehr + Leonard,
his ATTORNEYS.

Patented Mar. 25, 1952

2,590,181

UNITED STATES PATENT OFFICE 2,590,181

POWER MANIPULATED DETACHABLE
GOOSENECK FOR TRAILERS

Clyde C. Keesler, Prospect Park, Pa., assignor to
Rogers Brothers Corporation, Albion, Pa., a corporation of Pennsylvania Application December 23, 1949, Serial No. 134,818

12 Claims. (Cl. 214—85)

This invention relates to highway tractor-trailer combinations and particularly to trailers and detachable goosenecks therefor and is an improvement on the trailer described and claimed in the application of Hugh L. Rogers, Serial No. 129,614, filed November 26, 1949.

As therein more fully described, in the presently used types of heavy duty trailers, the rear of the trailer body is supported on detachable wheel assemblies and the front end of the trailer is supported by a suitable upwardly and then forwardly extending gooseneck, the gooseneck carrying a downwardly exposed fifth wheel member so as to detachably support the front end of the trailer on a complementary upwardly exposed fifth wheel member on the rear of a tractor or front wheel assembly.

The body, or load supporting platform, of such trailers is maintained at as low a level as possible so as to lower the center of gravity of the heavy loads, to afford load clearance beneath bridges and other overhead obstructions across the highway, and to provide for convenience in loading. To maintain a low bed or platform, the wheels often are permitted to extend above the platform or body level. Such trailers generally are loaded from the rear. This necessitates moving the load over the wheels or removing the wheels. In loading over the wheels, suitable ramps are built with boards and blocking, and the load is moved up the ramp and over the wheels into loaded position onto the platform or trailer body. Since the loads, such as heavy power shovels, steam rollers and large construction equipment, often weigh many tons, seventy to one hundred tons being common, loading over the wheels by means of ramps is a very hazardous undertaking. A slight shift in the load may cause it to tip over or slide or skid off the ramps to one side. This hazard increases greatly as the height and gradient of the ramp are increased. Furthermore, the higher the ramp must be made, the longer it must be made to maintain a reasonable gradient.

Again, as the load passes over the peak of the ramp, which is at the top level of the wheels, and becomes overbalanced forwardly and rearwardly, the forward end of the load drops suddenly to platform level subjecting both the load and trailer to severe stresses and endangering the lives of the workmen.

In order to minimize such hazards of loading, the wheels of the trailers are kept as small as possible so as to reduce the gradient and height of the ramp.

If large diameter wheels are used on the rear of the trailer then ramps such as described above usually are not used but the rear wheel assemblies are removed so that the rear end of the trailer body rests on the ground. By this method of loading, no ramp or only a limited height ramp is required. After loading, however, the rear end of the trailer must be raised by suitable jacks and the like and the wheel assemblies reattached. This operation with heavy loads is not only extremely hazardous but time consuming.

The present invention comprises generally a detachable gooseneck for trailers of the character described and complementary weight supporting detachable coupling members on the lower portion of the gooseneck and on the forward end of the trailer respectively, which, when the front end of the trailer is resting on the ground and the gooseneck is supported by the usual fifth wheel on a tractor or front wheel assembly, can be moved substantially into vertical alignment with each other merely by backing the gooseneck into position, and an extensible compression member carried by the gooseneck and adapted to be extended by tension, exerted by the tractor loading winch, on a cable associated with the extensible compression member, so as to engage the ground and elevate the portion of the gooseneck carrying the coupling member and thereby move the coupling member into weight supporting relation to the coupling member on the trailer, and then lift the front end of the trailer into proper travelling position, and latching means movable into position to secure the coupled gooseneck and front end of the trailer in normal operating position.

Likewise, the gooseneck can readily be detached and removed from the trailer merely by slackening the cable and thereby causing the extensible compression member to lower the front end of the trailer and the portion of the gooseneck carrying the coupling member until the front end of the trailer rests upon the ground, and then additionally slackening the cable and thereby lowering the gooseneck until the coupling members are detached from each other and the weight of the gooseneck is supported on the tractor or front wheel assembly clear of the ground, and then moving the gooseneck forwardly out of position. As a result, the trailer can be loaded over the front end with no ramp or a very short ramp of very limited height. Furthermore, there is no rocking of the load forwardly and rearwardly as is the case when, in loading over the wheels, the center of gravity of the load passes the highest level of the wheels and the load overbalances and drops or rocks downwardly onto the trailer body.

Another feature of the invention resides in the connection of the gooseneck and trailer in such a manner that the gooseneck can be unlatched without detachment and tilted, by tightening or loosening the cable, respectively, forwardly and rearwardly with respect to the trailer body while its fifth wheel member is connected to that of the tractor or front wheel assembly, whereby the forward end of the trailer body can be lowered while moving the load under overhead obstructions and can be raised for affording greater road clearance when passing over abrupt changes in grade, such as over railroads and the like.

Due to the factors heretofore described, it is possible to use larger diameter wheels for the rear end of the trailer with the consequent advantage of larger diameter tires which heat much less rapidly than smaller diameter tires under heavy loads and relatively high speeds.

Specific objects and advantages of the invention will become apparent from the following description wherein reference is made to the drawings, in which.

For the purposes of illustration the invention is described in connection with the usual girder or I-beam type of semi-trailer adapted to be supported at its front end on the rear of a tractor, its application to other types of trailers and those supported at the front on front wheel assemblies being readily apparent from the illustrative example.

In the form illustrated, the trailer comprises a pair of longitudinal weight supporting girders or sills 1 which are spaced apart equidistantly from the longitudinal median line of the trailer and which are connected together with suitable cross bracing, not illustrated, so as to provide a rigid body structure.

Suitable lateral beams extending outboard of the sills and a suitable load bearing platform carried thereon and on the sills may be provided if desired. The rear end of the trailer is supported by suitable rear wheel assemblies, indicated at 2, which may be detachable. This construction is well known in the art.

The gooseneck of the present invention may comprise the usual rigid upright side members 3 spaced laterally of the trailer from each other and forwardly extending horizontal members 4 secured to the upper ends thereof. All of these members may be constructed in whole or part of suitable I-beams, or structural steel elements, or they may be fabricated of suitable plate steel portions welded together. Bridging between and connecting the upright members 3 and horizontal members 4 are suitable tie plates 5. These tie plates 5 preferably are welded at their edges to the edges of the top flanges of the members 4 and to the rear edges of the upright members 3, thus providing a transversely rigid structure. Suitable reinforcing gussets 6 may be provided between the forward portion of the upright members 3 and the horizontal members 4. The gooseneck thus fabricated is very rigid.

As best illustrated in Figs. 1 through 4, the forward end of the horizontal members 4 are beveled upwardly forwardly at their under surface, as indicated at 7, and a skid plate 8 is secured thereto and bridges across between the members 4. The skid plate preferably extends toward the upright members 3 beyond the bevel 7 a sufficient distance to rest on and form the main bearing surface or plate for cooperation with the usual upwardly exposed fifth wheel member 9. The usual king pin of the fifth wheel is carried on the gooseneck within the limits of the plate 8.

In the form illustrated, a conventional upwardly facing fifth wheel member 9 is shown as connected to the rear of a tractor 10 for rocking about a horizontal shaft 11 which extends transversely of the tractor 10. This fifth wheel structure is one which is conventional and well known in the art and receives the king pin from the rear while the plate and bearing surface of the member 9 are in contact and is provided with suitable latching means to latch the king pin in the central socket of the member 9.

Referring to the details of the detachable gooseneck structure, secured to the lower edges of the upright members 3, respectively, are sockets, indicated generally at 12. Since they are the same in form and function, one only need be described. Each socket 12 is in the form of a box which is open at the rear of the gooseneck and is partially open at the bottom. The socket 12 may be formed of a top plate 13 and side plates 14 and a front plate 15, all of which are secured together by welding. The plates 14 are divergent rearwardly of the gooseneck so as to form a guide for the forwardly extending ends of the sills 1.

Figure 12:
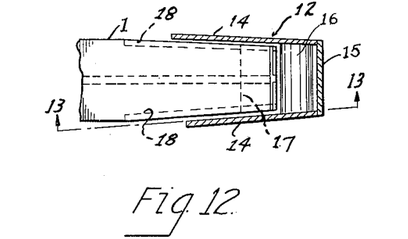
Fig. 12 is a fragmentary horizontal sectional view of a portion of the gooseneck and a portion of the front end of the trailer body preparatory to their movement into alignment for coupling and is taken on the line 12—12 in Fig. 13.
Figure 13:
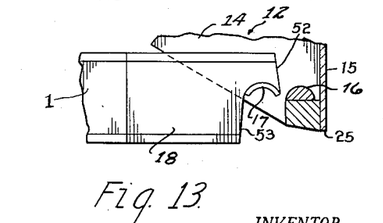
Fig. 13 is a fragmentary vertical sectional view of the portion of the gooseneck and forward end of the trailer body illustrated in Fig. 12 and is taken on line 13—13 of Fig. 12.
Figure 14:
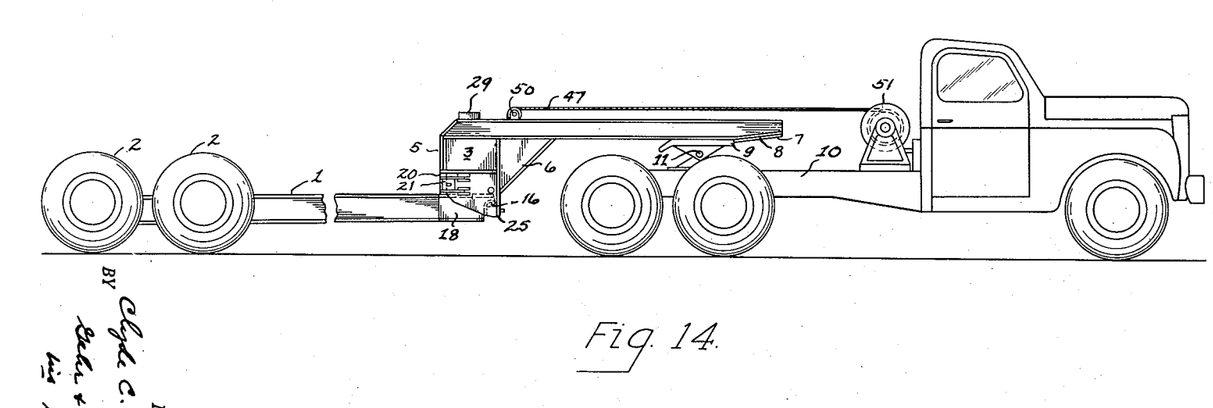
Fig. 14 is a side elevation of the coupled tractor-trailer combination embodying the present invention and showing the loading winch of the tractor connected to the cable.

Fixedly secured to the lower portion of the plate 15, at the rear face thereof, is an upwardly facing coupling member 16, the upwardly facing surface of which is preferably a half cylinder. The coupling member 16 is co-extensive in width with the socket 12 and the semi-cylindrical portion thereof is spaced rearwardly a short distance from the plate 15, as best illustrated in Figs. 12 and 13. The coupling members 16 are adapted to engage with complementary downwardly facing coupling members 17 mounted on the forward ends of the longitudinal sills 1, respectively. The forward end of each longitudinal sill 1 is tapered laterally inwardly toward the forward ends of the sills so as to be substantially complementary to the inner faces of the plates 14. Suitable side skid plates 18 are secured to the forward ends of the sills 1 to reinforce them and to guide them accurately into the open rear ends of the sockets 12.

Pivotally secured on the plates 14 for swinging movement about upright axes are suitable pairs of brackets 19, the brackets 19 extend rearwardly of the sockets 12. Connected to the rear ends of the pairs of brackets 19 are locking members or plates 20, respectively, these locking members extending at substantially right angles to the brackets so as to be positioned across the open rear ends of the sockets when in locking position but being adapted to be swung outwardly and forwardly of the trailer into a fully retracted or inoperative position.

In order to latch the locking member 20 in locking position, a suitable plate 21 is secured between each pair of brackets 19 and is provided with an aperture through which is received a tongue 22 carried on the plates 14. The tongue is arranged to extend through the plate 21 and therebeyond when the locking members 20 are in locking position. Each tongue 22 has a suitable aperture through which a cotter pin 23 is passed to latch the locking members in locking position.

The plate 5 heretofore described extends downwardly between the upright members 3 at the rear thereof and terminates at its lower edge at the level of the upper edge of the members 20 so as to permit the plates to swing into position beneath the lower edge of the plate 5 with operating clearance when the gooseneck and the trailer body are moved almost into normal attached relation with respect to each other.

It is apparent that when the coupling members 16 of the gooseneck and 17 of the trailer are in the normal coupling relation and the members 20 are inserted between the lower edge of the plate 5 and the top of the sills 1, the gooseneck is secured against rocking rearwardly. On the other hand, if the members 20 are removed or swung out of locking position, the gooseneck can rock rearwardly about the coupling members 16 and 17 relative to the trailer. Even with the locking members 20 in locking position, the gooseneck can be rocked forwardly but the load on the trailer and the weight of the trailer and gooseneck are so great that such forward rocking movement of the gooseneck normally does not occur. Instead, one of the points of greatest stress is the compressive force on the locking members 20 exerted upwardly by the sills 1 and downwardly by the plate 5.

In order to develop the full bearing capacity on the upper edges of the locking members 20 an extra plate 24 may be secured to the inner face of the plate 5 and extend above the sockets for engagement with the upper edges of the members 20.

It is apparent that with the structure described, the gooseneck can be detached from the trailer body by swinging the plates 20 into an idle position from between the sills 1 and the plates 5 and 24, lowering the front end of the trailer by permitting the gooseneck to tilt rearwardly until the front end of the trailer rests upon the ground and then tilting the gooseneck still further rearwardly to lower the coupling members 16 below the coupling members 17.

Figure 7:
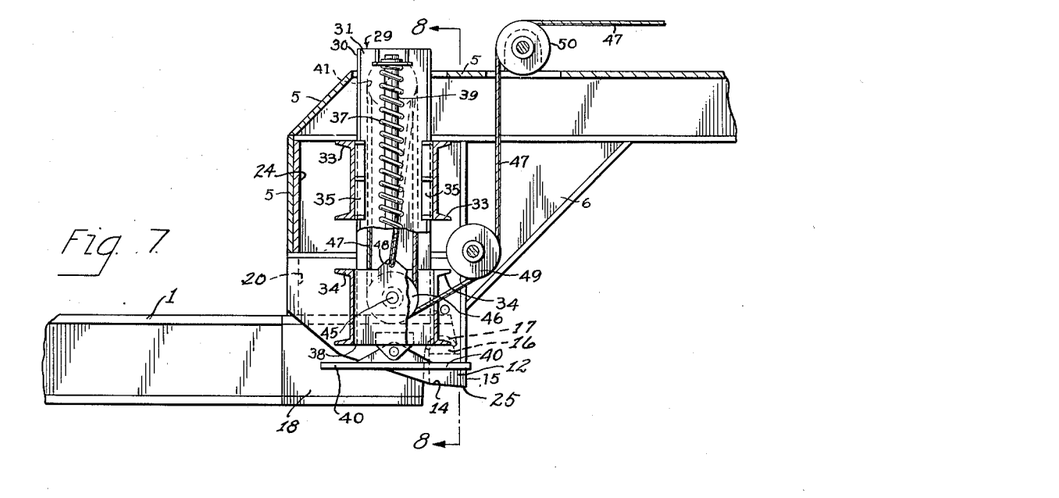
Fig. 7 is a view similar to Figs. 5 and 6 but showing the trailer and gooseneck in normal coupled position.

As best illustrated in Fig. 7, the lower edge of the gooseneck, indicated at 25, is positioned so that when the front end of the trailer body rests on the ground and the coupling member 16 is lowered to clear the lowest portion of the coupling member 17 the edge 25 clears the ground and the gooseneck can be moved forwardly free of the trailer.

In order to prevent the gooseneck from striking the ground and to maintain it at the right elevation so that while the front end of the trailer is resting on the ground the gooseneck can be moved rearwardly and the coupling member 16 caused to pass beneath but clear of the coupling member 17, suitable pads 27 and 28 are provided on the underside of the forwardly extending members 4 and the upper faces of the sills of the tractor 10. As illustrated, these pads are so arranged that when the gooseneck has rocked downwardly about the shaft 11 of the fifth wheel until the pads are engaged with each other, the lower edge 25 of the gooseneck clears the ground and the highest point of the coupling member 16 clears the lowest point of the coupling member 17 of the trailer.

Figure 8:
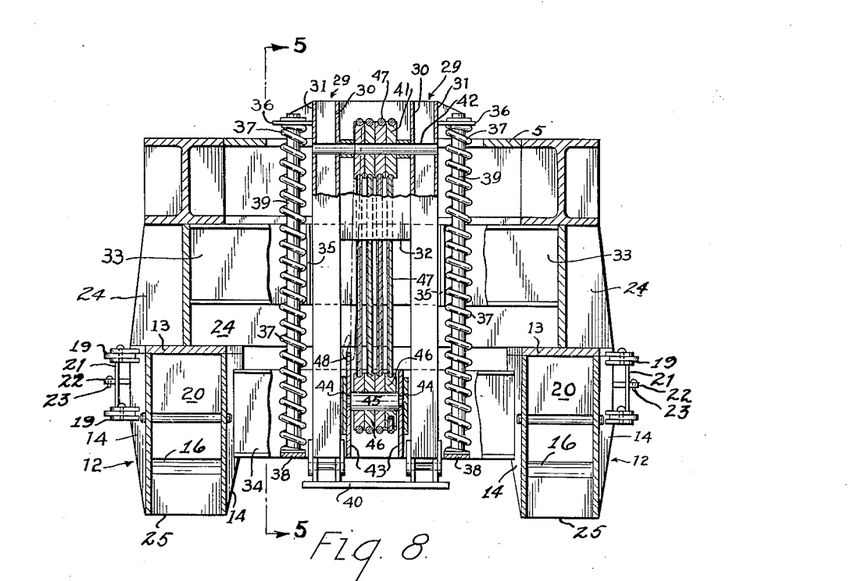
Fig. 8 is a slightly enlarged fragmentary sectional view of the detachable gooseneck taken on the line 8—8 in Fig. 7.
Figure 9:
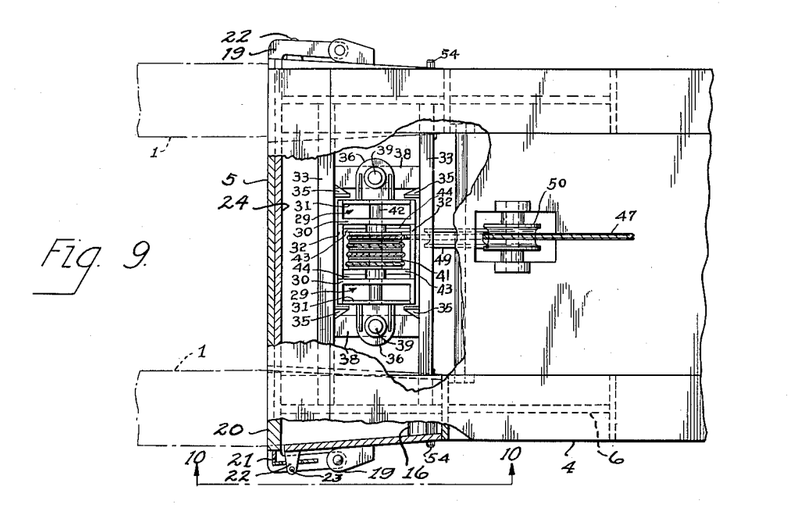
Fig. 9 is a fragmentary top plan view of the gooseneck and elevating and lowering means thereof, the position of the forward end of the trailer body when coupled thereto being indicated in broken lines.
Figure 10:
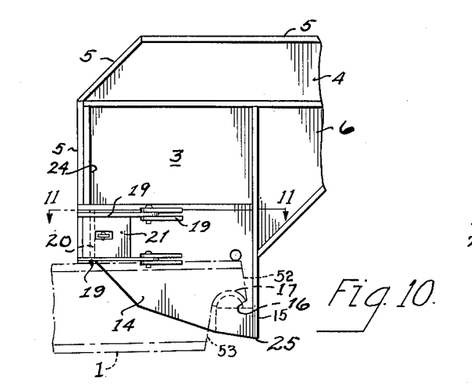
Fig. 10 is a fragmentary vertical sectional view taken on the line 10—10 in Fig. 9, the position of the forward end of the trailer body being indicated in broken lines.
Figure 11:
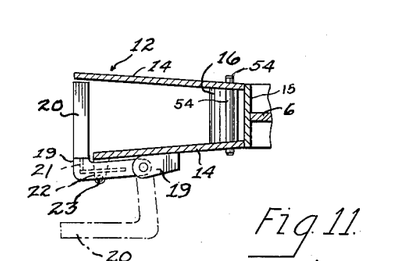
Fig. 11 is a fragmentary horizontal sectional view taken on the line 11—11 of Fig. 10 and illustrating the locking means.

In order to manipulate the gooseneck and trailer for attachment and detachment and for positioning the gooseneck selectively in normal position and forwardly and rearwardly tilted positions with respect to the forward end of the trailer, an elevating and lowering means preferably in the form of suitable extensible compression members 29 are provided. In the form illustrated, each of the extensible compression members 29, which together form the elevating means, comprises an elongated rigid leg which preferably is in the form of a structural channel 30 mounted, as is hereinafter described, on the gooseneck in generally upright position with its open side facing outboard of the trailer. In order to afford greater rigidity and a lateral slide bearing surface, each channel is closed at its open side by a plate 31 which is preferably welded thereto, as best illustrated in Figs. 8 and 9. For greater stability in resisting lateral thrusts on the trailer, two such legs, spaced apart transversely of the gooseneck and secured together at their upper portions in parallelism by bearing plates 32, are provided.

The members 29, thus secured to form a rigid unitary elevating means are mounted on the gooseneck for vertical sliding movement.

A suitable mounting may comprise a pair of upper transverse guide beams 33 and a pair of lower transverse guide beams 34 each beam being rigidly connected at its ends to the side or other members of the gooseneck. The guide beams may be structural channels arranged with their bases facing and spaced from each other forwardly and rearwardly of the gooseneck. The beams of the upper pair are parallel to each other and accommodate the members 29 therebetween in upright position with operating clearance for vertical sliding movement.

The lower beams 34 are similarly arranged and similarly accommodate the lower portion of the members 29. Thus a guide frame is provided which embraces the outer forward and rearward surfaces of the channels 30 and the plates 32 with operating clearance and constrains the members 29 from rocking forwardly and rearwardly while permitting them to slide vertically. In order to constrain the members 29 from rocking laterally of the gooseneck suitable guide brackets 35 are provided at the outer faces of the members 29 and engage these faces with slight operating clearance. The guide members 35 preferably are coextensive vertically with the upper set of cross beams 33. Connected to the members 29 respectively at their outboard sides near the top are suitable brackets 36 for engaging the upper ends of suitable retraction compression springs 37. The lower ends of the springs are secured to suitable straps 38 secured in fixed position on the gooseneck. Mounted on the straps 38 are upright guide posts 39 which extend through the springs and through the brackets 36 for guiding and retaining the springs in place. The springs are of sufficient compression normally to raise and hold the members 29 in the fully raised or retracted position and at the same time are of sufficient strength to overcome the friction in the sheaves and the drag of the operating cable, both of which are described hereinafter. Mounted on the bottom of the members 29 is a suitable foot 40, the foot being connected to both members by suitable transversely extending pivots so that the foot may rock forwardly and rearwardly of the gooseneck. If desired, separate feet may be used on the members 29, respectively.

For extending the members 29 there are provided a plurality of upper sheaves 41 mounted on a common shaft 42 which at its ends is secured to both of the members 29 and bridges the space therebetween laterally of the gooseneck. Between the lower transverse beams 34 of the gooseneck are forwardly and rearwardly extending plates 43 on the outer surfaces of which are provided guide plates 44 for engaging the inner faces of the members 29 for guiding the lower ends of the members for vertical sliding movement. Mounted at its ends in the plates 43 is a suitable shaft 45 on which are mounted, between the plates 43, a plurality of sheaves 46. A cable 47 is connected at one end in fixed position with respect to the gooseneck, as indicated at 48, and passes successively around the upper and lower sheaves and then around suitable sheaves 49 and 50 fixedly mounted on the gooseneck. In the form illustrated the cable 47 passes beneath the sheave 49 and over the sheave 50 and thence forwardly to a power driven reversible loading winch 51 mounted on the tractor. Such power driven loading winches are common on tractors used in construction work and are driven in many ways from the engine of the tractor.

Figure 6:
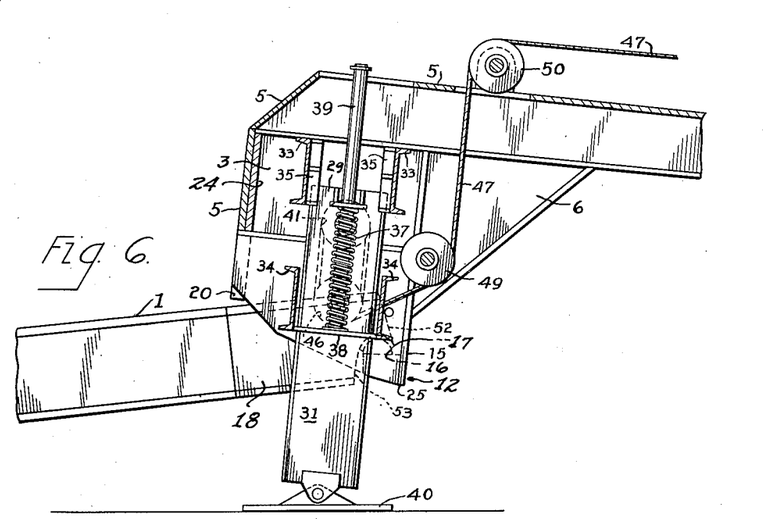
Fig. 6 is a view similar to Fig. 5 but showing the gooseneck elevated and the front end of the trailer supported thereon with the locking means moved into place.

Since the sheaves 46 are mounted at a fixed elevation on the gooseneck and the sheaves 41 are mounted in fixed position on the members 29, it is apparent that by tensioning and reeling in the cable the sheaves 41 are drawn toward the sheaves 46 thus pulling downwardly on the upper ends of the members 29 and forcing the members downwardly to extended position. The length of vertical travel of the members 29 from the retracted position shown in Figs. 7 and 8 to the extended position shown in Fig. 6 is such that the foot engages the ground and elevates the gooseneck sufficiently to elevate the forward end of the trailer body from the ground level to a point considerably above normal operating position, as will appear more fully hereinafter.

It will be noted that the forward ends of the sills 1 are bevelled rearwardly, as indicated at 52, from the forward edge of the coupling members 17 upwardly to compensate for arcuate travel of the sills and rearward tilt of the gooseneck while the members 16 and 17 are engaged and the forward faces of the sills are bevelled downwardly and rearwardly from the lower edges of the members 17, as indicated at 53, to provide clearance for the forward tilt of the gooseneck while the members 16 and 17 are engaged.

Figure 1:
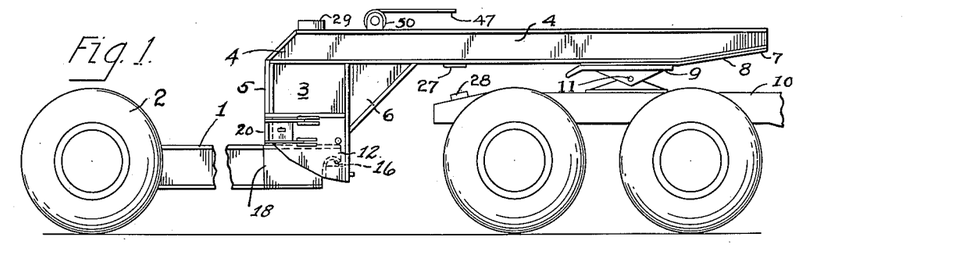
Fig. 1 is a fragmentary side elevation of a trailer, embodying the present invention, and a tractor coupled for operation.

The operation of the apparatus is best illustrated in Figs. 1 through 6, in all of which the members 29 are in retracted condition. In Fig. 1, the tractor 10 and the trailer are shown in their normal coupled relation for travel with the gooseneck in its normal attached and operating relation to the trailer. In this condition the forwardly extending members are generally horizontal, and the front or forward ends of the sills 1 are accommodated in the sockets 12 with the coupling members 17 resting on the upper surfaces of the coupling members 16 of the gooseneck. The locking plates or members 20 are under compression between the forward end portions of the top of the sills 1 and the lower edges of the plates 5 and 24. In this condition, there is no relative movement between the forward end of the trailer and the gooseneck.

Figure 2:
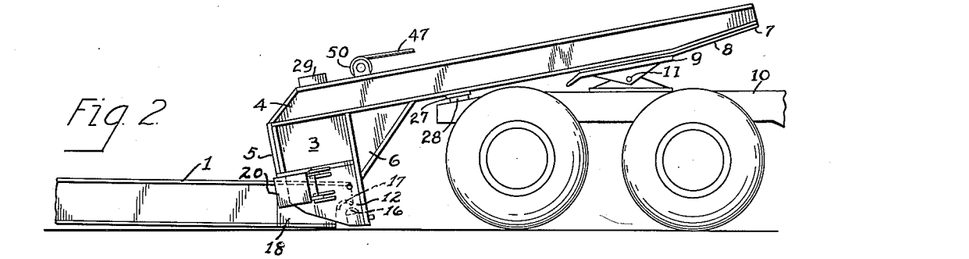
Fig. 2 is a view similar to Fig. 1 showing the trailer and detachable gooseneck in position for final coupling or uncoupling.

In Fig. 2 the front end of the trailer is resting on the ground and the coupling members 16 and 17 are disengaged, the gooseneck is tilted rearwardly about the shaft 11 of the fifth wheel and its weight is being supported by the pads 27 and 28. The member 16 is positioned to clear the lowest part of the member 17. In this position the gooseneck may be attached by tilting it forwardly about the shaft 11 or it may be moved forwardly clear of the trailer and ground with its weight supported on the tractor.

Figure 5:
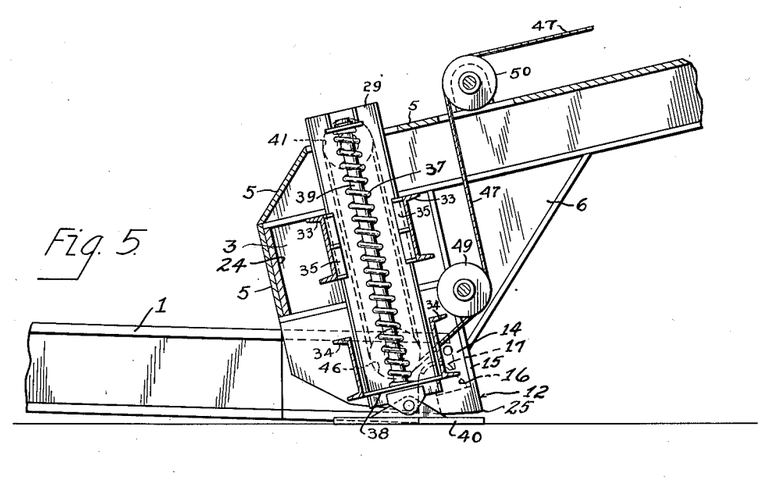
Fig. 5 is an enlarged fragmentary vertical longitudinal sectional view of a portion of a trailer and detachable gooseneck in position for coupling or for removal of the gooseneck and is taken on line 5—5 of Figs. 8 and 9.

As best illustrated in Fig. 5, assuming that the gooseneck is to be moved into position for attachment, the tractor is backed up until the peak of the semi-cylindrical portion of the coupling member 16 has passed rearwardly of the trailer beyond the forward lower edge of the coupling member 17. In this position, the cable 47 is sufficiently tightened to place the foot 40 on the ground. The cable is additionally wound in by the winch 51 thus extending the members 29 and thereby swinging the gooseneck upwardly about the axis of the fifth wheel shaft 11, causing the coupling members 16 to engage the coupling member 17 and seat therein, and elevating the forward end of the trailer until it is lifted slightly above its normal position as illustrated in Fig. 6. When thus lifted, the locking members 20 are swung into locking position between the sills 1 and the plates 5 and 24 and latched in such position by the cotter pins 23. When the locking members 20 are thus latched in position, the winch 51 is operated to pay out the cable 47, thus permitting the gooseneck to swing downwardly about the fifth wheel shaft 11 until the locking members 20 have engaged the top of the sills 1. Thereupon the gooseneck and trailer are coupled and the cable is additionally slackened and the members 29 are fully retracted by the springs 37.

To detach the gooseneck, the cable is reeled onto the winch to extend the members 29 against the ground and elevate the gooseneck and front end of the trailer to the relative position shown in Fig. 6, wherein the plate 20 is clear of the sills 1, whereupon the locking members 20 are removed from locking position and the cable is again payed out so as to permit the members 29 to retract and lower the front end of the trailer and the gooseneck again to the position illustrated in Figs. 5.

If desired, a suitable locking pin 54 may be provided in each socket 12 in position to engage the upper surface of the sills 1 and prevent their being lifted off the coupling members 16 when the gooseneck and trailer are in their normal attached condition. However, such pin is not necessary.

Figure 3:
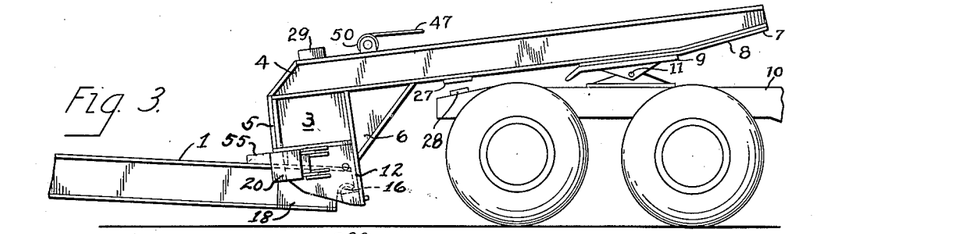
Figs. 3 and 4 are views similar to Fig. 1 with the trailer and detachable gooseneck coupled but with the gooseneck tilted rearwardly and forwardly respectively.

As mentioned, it is sometimes desirable to lower the trailer to clear overhead obstructions such as bridges and the like. In order to obtain this lowering of the trailer, the piston and cylinder assemblages are operated to elevate the gooseneck sufficiently to permit removal of the locking members 20. The members 20 are removed from locking position, and suitable rigid blocks 55 of metal of the desired height are interposed between the tops of the forward ends of the sills 1 beneath the under edges of the plates 5 and 24 where the under edges of the plates extend across the top of the sockets at the rear of the latter. The members 29 then are operated to permit the gooseneck to tilt rearwardly until the plates 5 and 24 engage the tops of the blocks 55 and thereby arrest the downward movement of the gooseneck, as illustrated in Fig. 3. This operation lowers the forward end of the trailer body to the desired position but suspends it clear of the ground at the desired height. Since the loads are moved very slowly under such conditions the weight of the trailer and load is sufficient to keep the coupling members 16 and 17 in engagement while exerting the necessary pull on the trailer for moving it beyond the overhead obstruction after which the gooseneck and trailer are reattached and locked in normal position.

Figure 4:
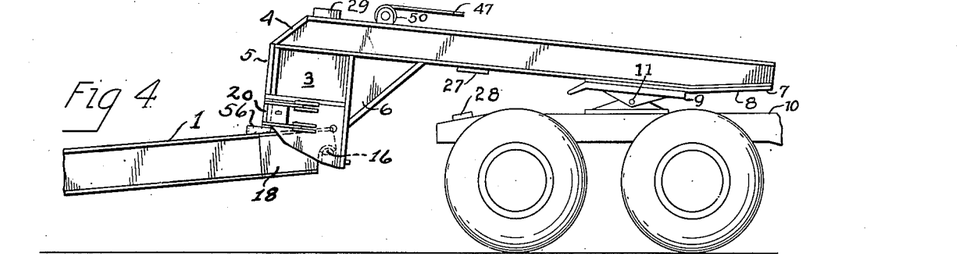

On the other hand, where greater road clearance is desired, the members 29 can be operated to rock the gooseneck forwardly about the shaft 11 and elevate the front end of the trailer body to a position such as illustrated in Fig. 4, the plates or members 20 remaining in locking position on the gooseneck. When in this position, blocks 56 of the desired height may be interposed between the tops of the sills 1 and the lower edges of the locking plates 20 for maintaining the gooseneck in this position until the trailer has been moved beyond the surface obstruction on the road after which the piston and cylinder assemblages are operated to tilt the gooseneck forwardly, the blocks 56 are removed, and the gooseneck then is lowered to normal position, whereupon the locking plates or members 20, which have been left in locking position, again engages the sills 1.

Having thus described my invention, I claim:

1. The combination with a tractor, a power operated winch thereon, a trailer including a body, a gooseneck on the forward portion of the body and having an upwardly extending portion and a forwardly extending portion overhanging the rear of the tractor and coupled thereto by a fifth wheel which is rockable about an axis extending transversely of the tractor, of complementary coupling means on the gooseneck and forward portion of the body detachably coupling the gooseneck and body together with the rear portion of the gooseneck and forward portion of the body in a predetermined elevated position, ground engaging extensible compression elevating means carried by, and movable upwardly and downwardly relative to, the gooseneck and operable to be moved into engagement with the ground and elevate the rear portion of the gooseneck, and thereby the forward portion of the body, when the body is connected to the gooseneck, to said elevated position, a cable connected to said winch for reeling up thereby, power multiplying and applying means operatively interposed between and connecting the cable and elevating means and operated by reeling up of the cable to operate the elevating means for elevating and lowering the rear portion of the gooseneck and forward portion of the trailer to and from, respectively, said predetermined position, and means to lock said gooseneck and trailer in coupled relation in said predetermined elevated position.

2. The combination of claim 1 characterized in that said power multiplying and applying means comprises a plurality of upper sheaves on the gooseneck and a plurality of lower sheaves on the elevating means and said cable is successively looped about said sheaves for drawing the upper sheaves toward the lower sheaves upon reeling in of the cable by the winch.

3. A trailer including a body supported at the rear by wheel assemblies, a gooseneck member for the front end of the body, complementary coupling means on the forward portion of the body and on the gooseneck member, respectively, and movable relatively to and from the coupling position upon elevating and lowering the gooseneck member, and operative, when coupled, to elevate the forward portion of the body by and upon elevation and lowering of the gooseneck member, a generally upright slideway on the gooseneck member, a compression member slidable therein and operable to be engaged with the ground and elevate the gooseneck member, and with it the body, when the body is coupled to the gooseneck member, when the compression member is moved downwardly and to lower the gooseneck member and with it the body, when the body is coupled to the gooseneck member, and to be retracted from the ground when the compression member is moved upwardly, a plurality of lower sheaves carried by the gooseneck member, a plurality of upper sheaves carried by the compression member above the level of said lower sheaves, a cable looped successively about the sheaves and having one end anchored to one of the members and the other free for connection to a tension applying means.

4. A trailer including a body and wheel assemblies supporting the rear end of the body, a gooseneck member for the forward end of the body, coupling means on the lower portion of the gooseneck member and on the forward portion of the body, respectively, and operable to engage and couple the body and gooseneck member upon predetermined movement of the lower portion of the gooseneck member in one direction along a generally upright path and to disengage and uncouple the gooseneck member and body upon predetermined movement of the gooseneck member in the opposite direction, said coupling means being operative, when the lower portion of the gooseneck member is elevated and lowered with the body coupled thereto, to support the weight of, and elevate and lower, the forward portion of the body, an extensible compression member carried by the gooseneck member and operable to be engaged by the ground and elevate and lower said portion of the gooseneck member, selectively, and thereby the forward portion of the body, when the body is coupled to the gooseneck member, when the extensible compression member is moved to extended and retracted positions, respectively, operating means on the extensible compression member and connected to the gooseneck member and operable when moved to one position to extend the extensible compression member, a tension cable operatively connected to the operating means so as to move the operating means to said one position when the cable is moved endwise under tension.

5. A trailer according to claim 4 characterized in that said operating means comprises a sheave rotatably mounted on the gooseneck member for movement therewith, a sheave rotatably mounted on the extensible compression member at a level above the first sheave for movement with the extensible compression member, and said cable is connected at one end to one of the members and between its ends is looped about said sheaves successively.

6. A trailer including a body and wheel assemblies supporting the rear end of the body, a gooseneck member for the front end of the body, coupling means on the gooseneck member and forward portion of the body, respectively, and operable to engage and couple the body and gooseneck member and to elevate the forward portion of the body by the gooseneck member upon movement of the gooseneck member upwardly a predetermined distance and to lower the forward portion of the body by the gooseneck member and uncouple the gooseneck member therefrom upon predetermined movement of the gooseneck member and forward portion of the body downwardly, an extensible compression member carried by the gooseneck member and operable to engage the ground and elevate and lower, selectively, said portion of the gooseneck member when the extensible compression member is moved to extended and retracted positions, respectively, operating means on the extensible compression member and connected to the gooseneck member and operable when moved to one position to extend the extensible compression member, a tension cable operatively connected to the operating means so as to move the operating means to said one position when the cable is moved endwise under tension.

7. A trailer including a body and wheel assemblies supporting the rear end of the body, a gooseneck member for the front end of the body, means detachably coupling a portion of the gooseneck member and forward portion of the body together for supporting the forward portion of the body by the gooseneck member and for relative rocking movement of the body and gooseneck member about a transverse axis upon raising and lowering of said portion of the gooseneck member, means to lock the body and gooseneck member against rearwardly rocking movement of the gooseneck member relative to the body in different relatively rocked positions of the gooseneck member and the body, an extensible compression member mounted on the gooseneck member for movement relative thereto upwardly and downwardly and operable when moved downwardly to engage the ground and elevate said portion of the gooseneck member and thereby the forward portion of the body, power multiplying and applying means operatively connecting said members for effecting downward movement of the extensible compression member upon operation of the power multiplying and applying means, a cable connected to the power multiplying and applying means and operative to operate the power multiplying and applying means for moving the compression member downwardly when the cable is moved in one direction under tension and to release the power multiplying and applying means when the cable is released.

8. A trailer according to claim 7 characterized in that means are provided to restore the power multiplying and applying means to starting position and thereby retract and lift the compression member relative to the gooseneck member when the cable is released for movement in the opposite direction.

9. A trailer including a body and wheel assemblies supporting the rear end of the body, a gooseneck member, means detachably coupling the forward portion of the body and a portion of the gooseneck member, a generally upright slideway on the gooseneck member, a compression member slidable therein, a plurality of upper sheaves carried by the compression member at its upper portion, a plurality of lower sheaves carried by the gooseneck member below the level of the upper sheaves, a cable looped successively about the sheaves and having one end anchored to one of the members and the other end free for connection to a winch for reeling up the cable, means for retracting the compression member when the cable is released for unreeling, and said compression member being operable to engage the ground and elevate the gooseneck member and forward end of the trailer when the compression member is moved downwardly and to lower the gooseneck member and forward portion of the body and be retracted from the ground when the compression member is moved upwardly.

10. A rigid frame member having an upper forward portion adapted to be connected to and supported by the rear of a tractor and having a rear portion depending therefrom, weight supporting means on the rear portion adapted for connection to an extraneous load, a generally upright slideway on the frame member, a compression member slidable therein, a plurality of upper sheaves carried by the compression member, a plurality of lower sheaves carried by the frame member below the level of the upper sheaves, a cable looped successively about the sheaves and having one end anchored to one of the members and the other end free for connection to a winch for reeling up the cable, means to retract the compression member when the cable is released for unreeling, and said compression member being operable to engage the ground and elevate the rear portion of the frame member when the compression member is thus moved downwardly and to lower the rear portion of the frame member and be retracted from the ground when the compression member is moved upwardly.

11. A trailer including a body and wheels supporting the rear end of the body, a rigid gooseneck member for the forward portion of the body and having an upper portion adapted to be supported on, and tractively connected to, a tractor, and having a lower rear portion adapted to occupy a position to the rear of the tractor when the forward portion of the gooseneck member is so supported, weight supporting means on the rear portion of the gooseneck member and on the forward portion of the body, respectively, and engageable with each other when the body and gooseneck member are below normal load carrying position, and operable when so engaged to lift the forward portion of the body to normal load carrying position upon predetermined upward movement of the rear portion of the gooseneck member and to lower the forward portion of the body from normal load carrying position upon predetermined downward movement of the rear portion of the gooseneck member, means to tractively couple the gooseneck member to the body, power operable extensible compression means connected to and caried by the gooseneck member and adapted to engage the ground therebeneath at the lower end and operable, when so engaged, to effect said predetermined upward and downward movements of the gooseneck member, and of the body member by the gooseneck member when the weight supporting means are in engagement, and means to lock the gooseneck member and body in said normal load carrying position when coupled, characterized in that said power operable extensible compression means comprise a generally upright slideway on the gooseneck member, a compression member slidable therein, a plurality of upper sheaves carried by the compression member, a plurality of lower sheaves carried by the gooseneck member below the level of the upper sheaves, a cable looped successively about the sheaves and having one end anchored to one of the members and having the other end free for connection to a winch for reeling up the cable, and means to retract the compression member when the cable is released for unreeling.

12. A trailer including a body and wheels supporting the rear end of the body, a rigid gooseneck member for the forward portion of the body and having an upper portion adapted to be supported on, and tractively connected to, a tractor, and having a lower rear portion adapted to occupy a position to the rear of the tractor when the forward portion of the gooseneck member is so supported, weight supporting coupling means on said rear portion of the gooseneck member and on the forward portion of the body, respectively, and adapted to be connected for relative rocking movement about an axis extending transversely of the body while the forward portion of the body and rear portion of the gooseneck are below the normal load carrying position of the trailer and, when connected, to raise and lower the forward portion of the body by predetermined upward and downward movements, respectively, of the rear portion of the gooseneck member, power operable extensible compression means connected to and carried by the gooseneck and adapted to engage the ground therebeneath at the lower end and operable, when so engaged, to effect said predetermined upward and downward movements of the gooseneck member, and the forward portion of the body by the gooseneck member when the coupling means are in engagement, means to lock the gooseneck member and body in said normal load carrying position when coupled, characterized in that said power operable extensible compression means comprises a generally upright slideway on the gooseneck member, a compression member slidable therein, a plurality of upper sheaves carried by the compression member, a plurality of lower sheaves carried by the gooseneck below the level of the upper sheaves, a cable looped successively about the sheaves and having one end anchored to one of the members and the other end free for connection to a winch for reeling up the cable, and means to retract the compression member when the cable is released for unreeling.

CLYDE C. KEESLER.

REFERENCES CITED

The following references are of record in the file of this patent:

UNITED STATES PATENTS

| Number | Name | Date |
|---|---|---|
| 2,223,650 | Weber | Dec. 3, 1940 |
| 2,331,713 | Mosling | Oct. 12, 1943 |
| 2,350,841 | Troche et al. | June 6, 1944 |
| 2,389,211 | Pointer | Nov. 20, 1945 |
| 2,408,401 | King | Oct. 1, 1946 |
| 2,441,710 | Martin | May 18, 1948 |
| 2,489,112 | Talbert | Nov. 22, 1949 |

FOREIGN PATENTS

| Number | Country | Date |
|---|---|---|
| 544,160 | Germany | Feb. 15, 1932 |